United States Patent
Howard

(10) Patent No.: US 6,293,610 B1
(45) Date of Patent: Sep. 25, 2001

(54) METHOD AND APPARATUS FOR A DOOR SYSTEM FOR GOLF CART-TYPE STREET VEHICLE

(76) Inventor: Jayne A. Howard, P.O. Box 3282, Bald Head Island, NC (US) 28461

( * ) Notice: Subject to any disclaimer, the term of this patent is extended or adjusted under 35 U.S.C. 154(b) by 0 days.

(21) Appl. No.: 09/496,129

(22) Filed: Feb. 1, 2000

(51) Int. Cl.[7] .................................................... B60J 5/00
(52) U.S. Cl. .................. 296/148; 296/77.1; 280/DIG. 5; 180/908
(58) Field of Search ................... 296/78.1, 77.1, 296/146.5, 147, 148, 203.03; 280/DIG. 5; 180/65.1, 908

(56) References Cited

U.S. PATENT DOCUMENTS

| 523,179 | * | 7/1894 | Schuricht . | |
|---|---|---|---|---|
| 1,157,266 | * | 10/1915 | Twombly . | |
| 1,427,660 | * | 8/1922 | Voltz . | |
| 2,460,399 | | 2/1949 | Schassberger | 296/148 |
| 2,682,427 | | 6/1954 | Bright | 296/148 |
| 4,070,056 | | 1/1978 | Hickman | 296/148 |
| 4,133,574 | | 1/1979 | Martin | 296/190.09 |
| 4,313,517 | * | 2/1982 | Pivar . | |
| 4,336,964 | | 6/1982 | Pivar | 296/77.1 |
| 4,621,859 | | 11/1986 | Spicher | 296/77.1 |
| 4,644,699 | | 2/1987 | Chandler et al. | 49/502 |
| 4,932,714 | | 6/1990 | Chance | 296/148 |
| 5,125,716 | | 6/1992 | Smith et al. | 296/190.11 |
| 5,203,601 | | 4/1993 | Guillot | 296/77.1 |
| 5,393,118 | | 2/1995 | Welborn | 296/147 |
| 5,975,615 | | 11/1999 | Showalter | 296/96.21 |

FOREIGN PATENT DOCUMENTS

| 154038 | * | 3/1952 | (AU) | 296/146.5 |
|---|---|---|---|---|
| 710901 | * | 6/1954 | (GB) | 296/77.1 |

* cited by examiner

Primary Examiner—Joseph D. Pape
Assistant Examiner—Patricia Engle
(74) Attorney, Agent, or Firm—Michael E. Mauney

(57) ABSTRACT

A door system to be used with low-speed street legal vehicles. A framework is molded to attach in a weather-tight fashion to an open side of a golf cart-like street legal vehicle. The framework has door openings to match the number of seats in the vehicle. Doors are attached to the framework on hinges that allow the doors to be lifted out and removed when desirable. The doors have locking handles. The frameworks and doors completely enclose the side of a low-speed street legal vehicle. The framework is designed to fit over and bolt to existing structures on the vehicle. It can be designed to replace a framing piece on the vehicle where it becomes a permanent attached part of the structure of the vehicle.

8 Claims, 6 Drawing Sheets

METHOD AND APPARATUS FOR A DOOR SYSTEM FOR GOLF CART-TYPE STREET VEHICLE

FIELD OF THE INVENTION

This invention relates generally to custom designed door systems or enclosures to be used with electrical vehicles. More specifically, it is designed to provide a weather tight door system that is durable and lockable for use with a street legal electrical vehicle like modified golf carts or golf cart-like vehicles.

BACKGROUND OF THE INVENTION

Small electrical vehicles are commonly used on golf courses to transport golfers and their golfing equipment around the course. These types of vehicles can be modified to provide transportation in other environments. They can be seen in large warehouses, airport terminals, or in other places where relatively low speed transportation over relatively short distances is desirable. Sometimes these vehicles may be modified to have two or more seats or to have a truck bed-like attachment on the rear of the vehicle to provide for increased cargo capacity. Some of these vehicles may have a low-power internal combustion engine as the power source rather than batteries and electrical motors.

Because golf carts are used outdoors and sometimes in inclement or cold weather they maybe equipped with an accessory enclosure called "winter curtains." A heavy, weather resistant, canvas-like material is used in combination with a flexible transparent vinyl, which drape over the top of a golf cart like curtains and enclose it on three sides. The golf cart usually has a transparent plastic windshield on the fourth side. These golf cart winter curtains are similar in design and in function. They are usually attached along the frame of the golf cart by heavy-strength hook-and-eye velcro-like attachments. There are also snaps, tie-downs, and zippers, all of which secure portions of the winter curtains to the golf cart while allowing openings accessible to occupants by double-sided zippers and the like.

These type of enclosures have a number of drawbacks. First, there is a lack of durability for these enclosures. These winter curtains rarely last more than one or two seasons. The plastic windows become clouded and difficult to see through and, after repeated outdoor exposure, may crack or lose flexibility. Because of the frequent use of the zippers as people enter or leave the vehicle, the zippers wear out relatively quickly. Moreover, the winter curtains are rarely as weather tight as is desirable when used in inclement weather.

Golf carts are not "street ready" vehicles. They have to undergo significant modifications before they can be driven legally on streets in most jurisdictions. First, they are required to be equipped with brake lights and turn signals. Secondly, they are required to have windshields and windshield wipers. Third, they are required to have seat belts. For a vehicle to be manufactured and sold for use on streets, it is required to meet certain regulatory requirements. These requirements may vary depending on how fast the vehicle is rated to travel. It is believed that vehicles that travel no faster than 25 miles per hour are not required to have air bags or some of the other safety equipment required for vehicles that travel more than 25 miles per hour. However, street legal electrically powered golf cart-type vehicles are highly desirable for use in some locations.

There are many resort environments, especially on islands, which restrict or prohibit internal combustion engines. Among islands that are like this are Bald Head Island, N.C. and Daufuskie Island, S.C. Even in resorts that allow private gas powered vehicles, their use can be discouraged. Additionally, there are many gated communities, either resort or retirement communities, which are largely self-contained. Within the gates of these communities, a full range of recreation and shopping services are available. Travel of more than two or three miles is rarely required and the use of an electrical vehicle on the streets within these gated communities or resorts is highly desirable. They are non-polluting, quiet and, when used properly, very safe within these restricted environments. Therefore, most major golf cart manufacturers, as well as certain specialized manufacturers, sell street ready electrical vehicles that are designed and function much like a golf cart, with the exception they are equipped with appropriate safety equipment to qualify to travel on highways in most jurisdictions. One example of a manufacturer of such a vehicle is the Global Electric Motorcar(GEM™) located in Fargo, N.Dak. They sell a variety of vehicles in a golf cart-like design which operate off 12-volt, low-maintenance, deep-cycle batteries that charge off 110 volt outlet. Their GEM™ vehicles are equipped with head lights, seat belts, rear brake lights, windshield wipers, and turn signals and are street legal in most jurisdictions. They are rated for street speeds up to 25 miles per hour and to about 15 miles per hour on grass found on a golf course. The major automotive manufacturers are considering entering this market and Ford Motor Company has announced an electrical vehicle for this market. At the International Auto show in Detroit on Jan. 10, 2000, Ford Motor Company unveiled its "Think Neighbor" electrical vehicle. This is designed to be a street legal electrical vehicle for speeds up to 25 mph. It is expected to sell in the approximate $6,000.00 range and will be sold as an open vehicle without side panels or doors. The success of the GEM™ vehicles along with the entry of Ford Motor Company in this market is a recognition that vehicles like this are increasingly common in resorts and gated communities. However, these and other golf cart-like vehicles are not commonly equipped and sold with doors. Like a standard golf cart, the openings on the side of the vehicle are simply large rectangular or semi-circular openings where people enter and exit the vehicle without ever opening or closing a door. The standard golf cart winter curtains are available for these, as well as other golf cart-like street legal vehicles. However, these winter curtains carry with them the drawbacks of this type of winter enclosure, including lack of durability, lack of visibility, difficulty in entering and exiting, and they poorly insulate the occupants of the vehicle from inclement weather outside.

A variety of devices have been proposed to remedy the drawbacks of winter curtains for golf carts or such similar vehicles. One example is seen in Welborn U.S. Pat. No. 5,393,118. There, flexible vinyl curtains are attached to an aluminum tubing framing, which freely opens and closes, and mounts on the square tubing enclosure found on most golf carts. In Chance U.S. Pat. No. 4,932,714 a demountable, slidable golf cart door is disclosed. A panel of clear plastic slides toward the rear of the golf cart to expose the opening for entry or exit and will slide forward to at least partially enclose a golf cart opening when in place. Spicher U.S. Pat. No. 4,621,859 discloses a weather curtain system in combination with a pipe frame. This is apparently designed to be used with older type golf carts which ordinarily were not equipped with a roof. However, most golf carts now, and especially any golf cart designed for use on the street, will come equipped with a roof and an enclosing frame.

Despite these efforts there is still a need for a door system for low-speed golf cart-type vehicles that is durable, weather tight, easy to use, and can be locked.

SUMMARY OF THE INVENTION

The current door system invention is a molded framework with doors that attach thereto. The molded framework will be made of a suitable rigid, lightweight, weatherproof material, such as fiberglass or a number of plastics. Doors are designed to fit within openings within the molded framework system and will themselves be made of lightweight weatherproof material. There will be openable windows on the doors. The doors will firmly latch with appropriate weather seals and will be impervious to rain and cold winds. For vehicles such as the Global Electric Motorcar, the molded framework will actually replace a piece of the molding that forms the side fenders and lower framework on this vehicle. For other golf cart-like vehicles, the molded framework may attach to the metal frame and to the fenders of the vehicle, or may be molded to replace some part of the molded fenders on the vehicle. However the door system attaches, the resulting door enclosure system will be as rigid and durable as the vehicle itself. The doors will open and close by means of a standard door-like handle. For a vehicle equipped with this system, entry and exit will be no more difficult than it is in any other vehicle. The doors will be lockable to provide increased security for occupants of the vehicle and for any materials or goods that may be left inside the vehicle when the owner is away from the vehicle. Because the doors are specifically designed to fit within the molded framework, the doors will provide increased comfort for the occupants of the vehicle because they will be as weatherproof as a door system is in any other vehicle. The provision of this kind of door system will make low-speed golf cart-like vehicles equipped with the current invention as weather-tight as other vehicles on the road. It will greatly increase the utility of street ready low-speed vehicles for use in rainy or cold weather, adding to their overall attractiveness as an alternative to cars.

DETAILED DESCRIPTION OF DRAWINGS

Figure 1A:
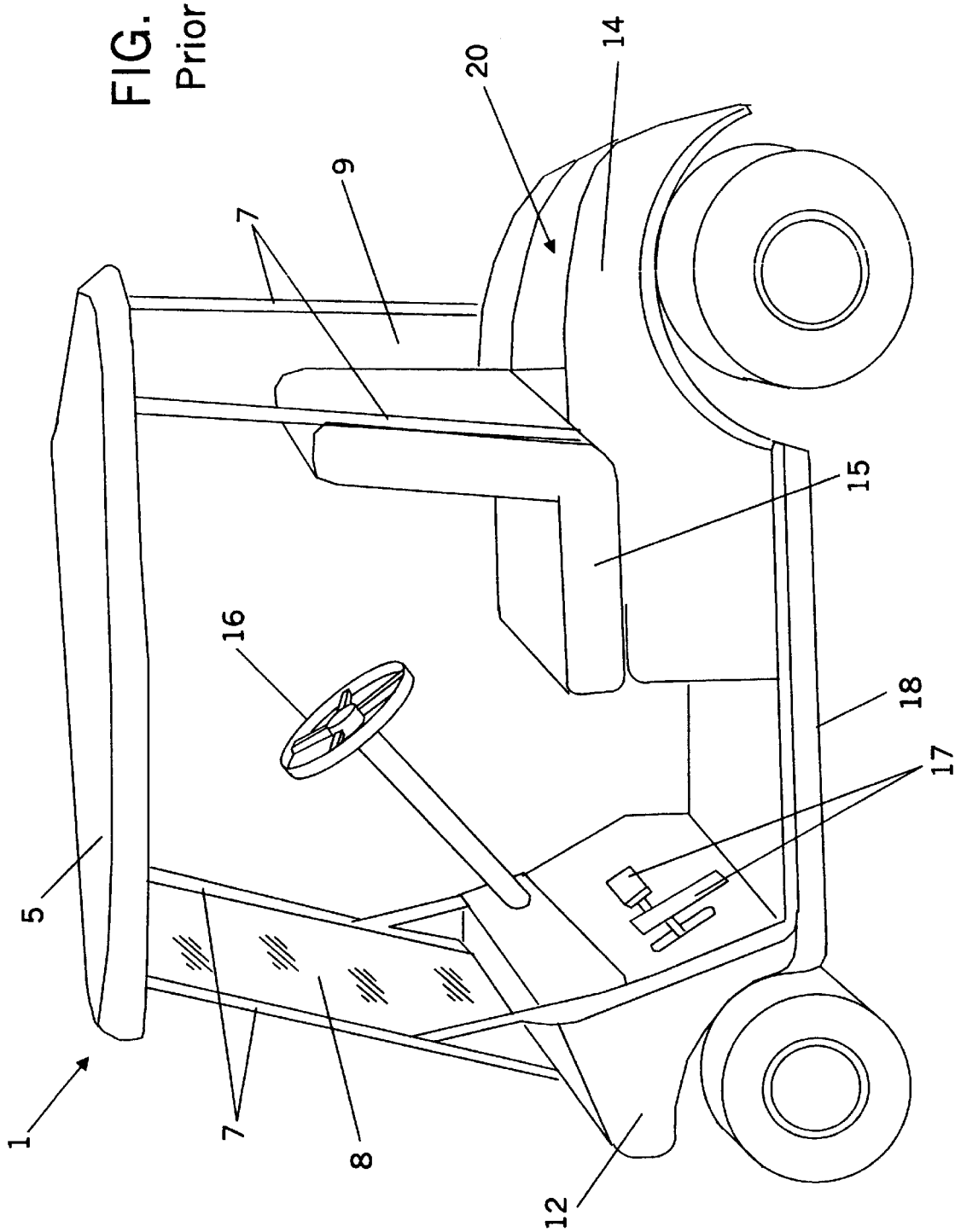
FIGS. 1A and 1B show a golf cart without and with a prior art winter curtain.

FIG. 1A shows a golf cart (1) in a typical configuration. There is a roof (5) supported by four rigid metal columns (7) and attached to the body of the golf cart (1). There is a transparent windshield (8). Inside the enclosure created by the roof (5) and the columns (7) there is a seat (15) for a driver (not shown) who controls the golf cart (1) by the steering wheel (16) and the pedals (17). Usually, there is a front side fender (12) and a rear side fender (14) that are connected by a floorboard (18). At the rear of the golf cart (1) there is ordinarily an open storage area (20) where golf clubs can be secured and held in place by framework and straps (not shown) and separated from the seat (15) by an open space (9).

Figure 1B:
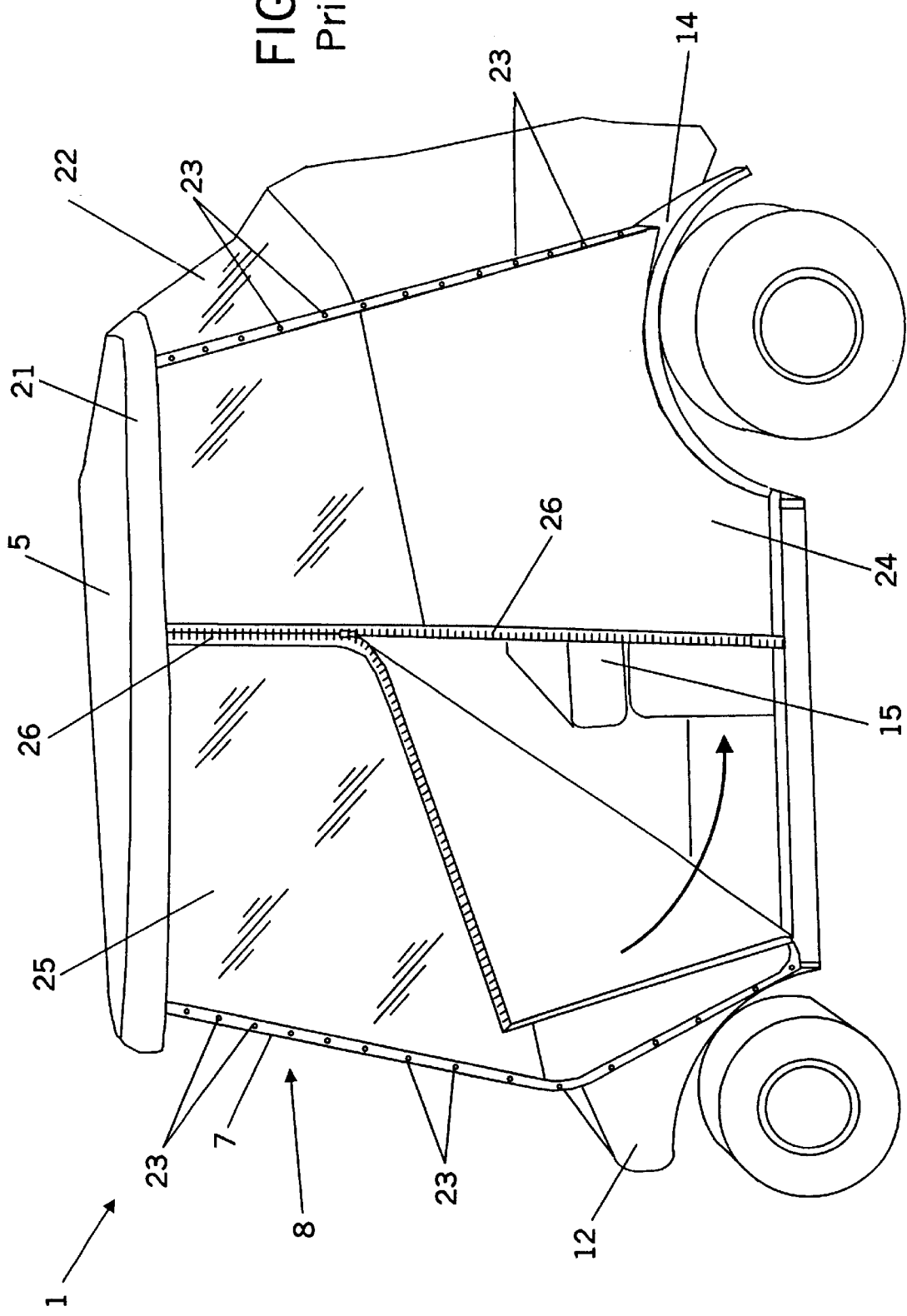

FIG. 1B shows a golf cart (1) with the addition of the standard winter curtains. Ordinarily, there is a heavy canvas or similar durable woven material top piece (20) that fits around and over the roof (5) of the golf cart (1). From this top piece (21) there is a rear curtain (22) which encloses the open space (9) (not shown). Disposed along the columns (7) are snaps (23) shown on columns (7) that are closest to the perspective of the viewer. Sometimes, instead of snaps (23), a heavy-duty hook-and-eye material (known by the trade name VELCRO™ will be attached by adhesive to the column (7). Corresponding hook-and-eye material or snaps will be placed on the side curtain (24) and door curtain (25). The side curtain (24), which is immediately adjacent to the seat (15), is shown folded down and in place by using the snaps (23) along the column (17) and along the rear fender (14). The door curtain (25) attaches to the side curtain (24) by a zipper (26) and to the column (7) and the front fender (12) by snaps (23). Here, the door curtain (25) is zipped open toward the roof (5) of the golf cart (1) opening a flap for entry and exit from the golf cart (1). Ordinarily, at least a portion of the side curtain (24), the door curtain (25), and the rear curtain (22) will be made of some kind of flexible, transparent, plastic material. This is to give the occupants of the vehicle the opportunity to see through these curtains for safe operation of the golf cart (1). Most golf carts are equipped with a transparent windshield (8) so there is not any need for a front curtain. Consequently, the winter curtains will ordinarily have a top (20), two side curtains (24), two door curtains (25), respectively positioned on opposite sides of the golf cart (1), with one rear curtain (22). The curtains may be detached from the points of fixation along the golf cart (1), whether they be snaps (23) or hook-and-eye material and rolled up in a stored position. Rolling an unrolling the curtains, snapping them, or pressing the other hook-and-eye material into place is a tedious process. Moreover, continually rolling and unrolling the curtains (22, 24, 25) causes the materials to be flexed and bunched, which causewear. If any portion of the material is rolled up while still wet, it increases the risk of mildew or water damage to the material. Operation of the zipper (26) to open and close the door curtain (25) is far more tedious and time consuming than simply opening and closing a standard car door. Moreover, the zipper (26) is subject to jams and damage as are all zippers.

Figure 2:
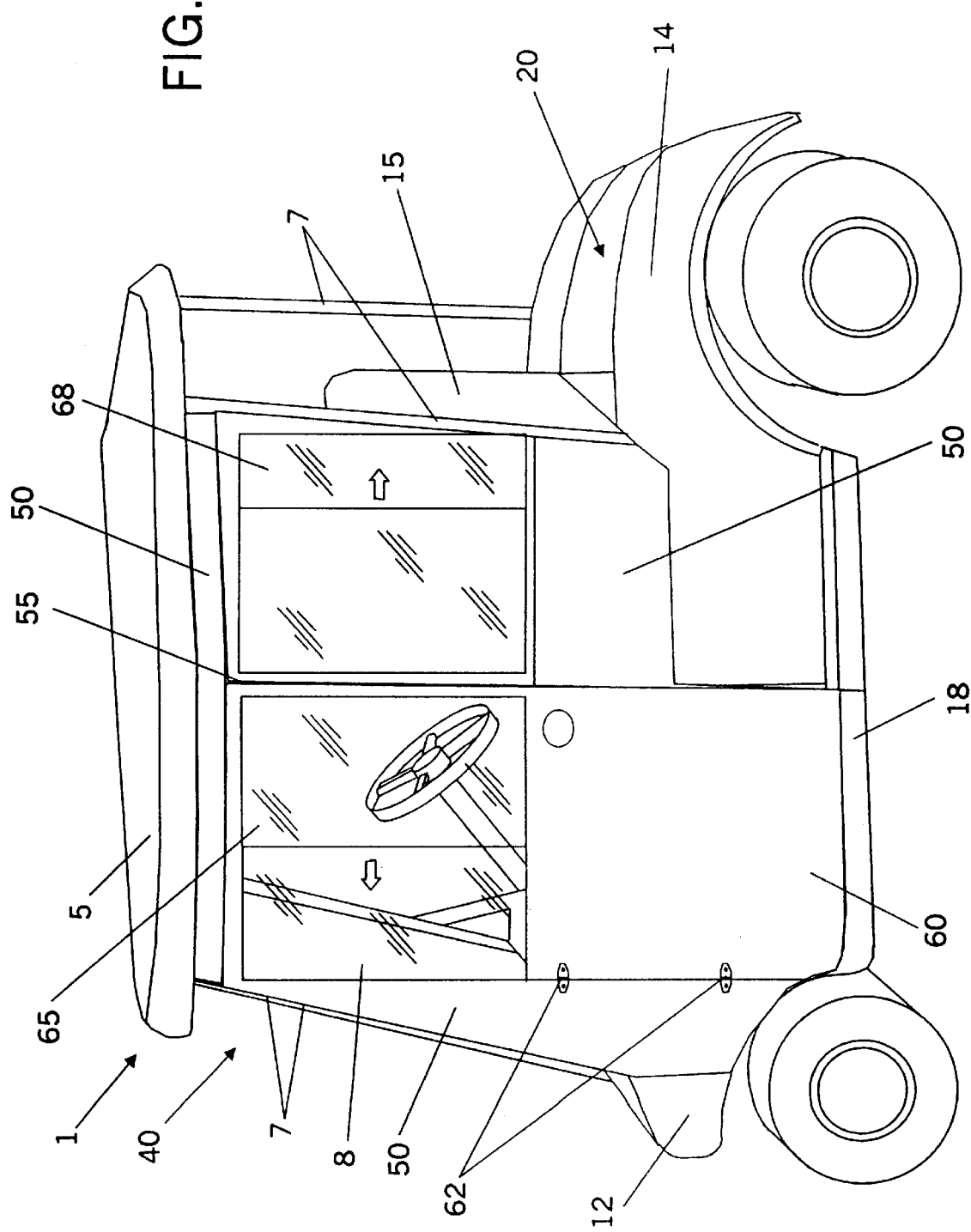
FIG. 2 shows in stylized form the current invention attached to a standard golf cart.

FIG. 2 shows in stylized form the current invention door system (40). There is a molded, rigid, durable framework (50), which will ordinarily be constructed of fiberglass or plastic. It will ordinarily be made of similar material to that of the golf cart front fender (12), rear fender (14), and floorboard (18). The framework (50) will vary depending on the construction of the golf cart (1) or the other type vehicle for which the door system (40) hence framework (50) is designed. Here, the framework (50) attaches to the front fender (12), the rear fender (14), and the floorboard (18) and is molded to fit the roof pillars (7) and run along with the golf cart roof (5). The framework (50) will be attached ordinarily by nuts and bolts and, where required, load spreaders (not shown). Within this framework (50) there is a central pillar (55). The door (60) uses hinges (62) attached at the framework (50) near the front fender (12) and the front pillar (7). The door (60) opens from the central pillar (55) on the hinges (62). There is a door window (65) which may be made of standard auto glass or a durable scratch-resistant plastic material like Lexlan. There is also a passenger window (68). Both the passenger window (68) and door windows (65) are constructed of two pieces to allow the windows to slide open in the direction shown by the arrows.

It will be understood by one of ordinary skill in the art, that the exact means of attachment of the framework (50), hence, the door system (40), will vary to some degree depending on the design of the vehicle to which it is being attached. If the door system (40) is targeted toward a vehicle that has removable panels, it may be molded to replace these panels on the target vehicle. In other applications the framework (50) of the door system (40) may bolt or use other means of attachments to the target vehicle. The exact method of attachment will vary depending on the design of the target vehicle, the utility of each potential method of attachment and the relative expense involved. It is anticipated in most applications that the door (60) or doors used will remain relatively unchanged for reasons of standardization and economy but the framework (50) will change, depending on the vehicle to which the framework is being attached.

The details of construction of the door system (40) will vary depending on the particular vehicle that it is designed for. The current golf cart market is dominated by two manufacturers—CLUB CAR and E-Z Go. They make a standard two-passenger, one-seat golf cart vehicle which is sold or leased to golf clubs for use by golfers on the courses. Sometimes this vehicle is sold with a carrying bin attached to the rear of the vehicle as opposed to a framework to attach golf bags to. These are sold primarily to industry, airports, and other places that require a small slow-moving vehicle for use often in warehouses or airport terminals. Golf carts are also available with two seats, a four- passenger model, or even three seats, a six-passenger model. However, for all of these vehicles, the standard winter curtains is the state-of-the-art for protection from inclement or cold weather. The golf carts or other types of electric vehicle sold by E-Z Go and CLUB CAR are ordinarily not equipped with seat belts, windshield and wipers, and turn signals - all of which are necessary to make the vehicle legal in most jurisdictions for travel on public streets or highways.

One electric vehicle manufacturer that primarily specializes in selling street-legal electric vehicles for travel up to 25 mph is the Global Electric Motorcars of North Dakota. It is expected that Ford Motor Company will enter this market with its "Think Neighbor" electric car sometime in the latter part of the year 2000. Just as with the Club Car and Easy Go, Global Electric Motorcars make a variety of vehicles—two-passenger, four- passenger, utility vehicles with carrying bins, and so on. Even though these vehicles have windshield wipers, turn signals, and seat belts, they do not come equipped with a weather-tight door system, which restricts the vehicle's utility in inclement or cold weather. A particular embodiment designed for a street-ready electrical vehicle made by the Global Electric Motorcars of North Dakota is shown in subsequent drawings.

Figure 3:
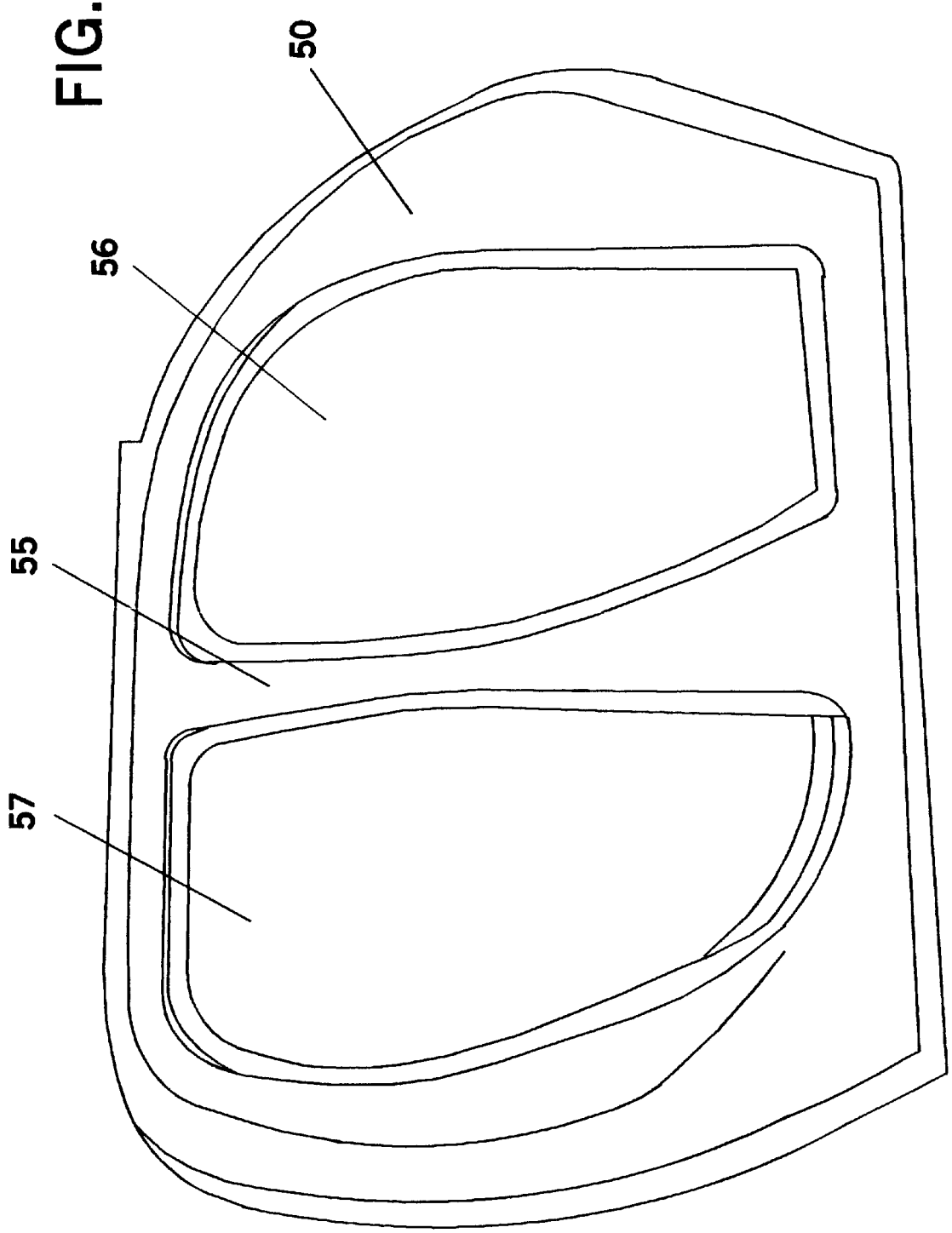
FIG. 3 shows the framework of the current invention for use with one type of street-ready low-speed vehicle.
Figure 4:
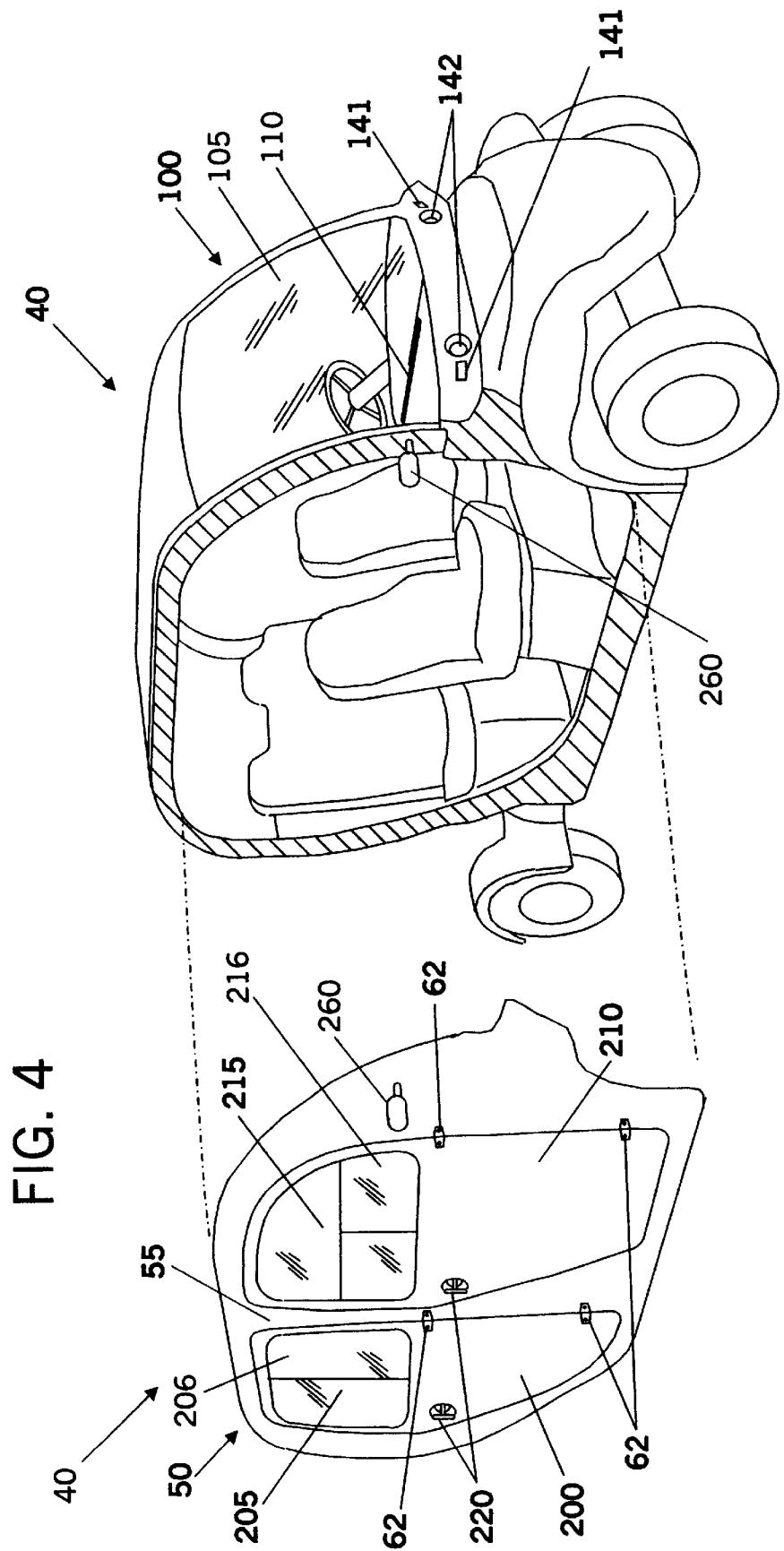
FIG. 4 shows the current invention beside the passenger's side of one type of a street-ready low-speed vehicle.
Figure 5:
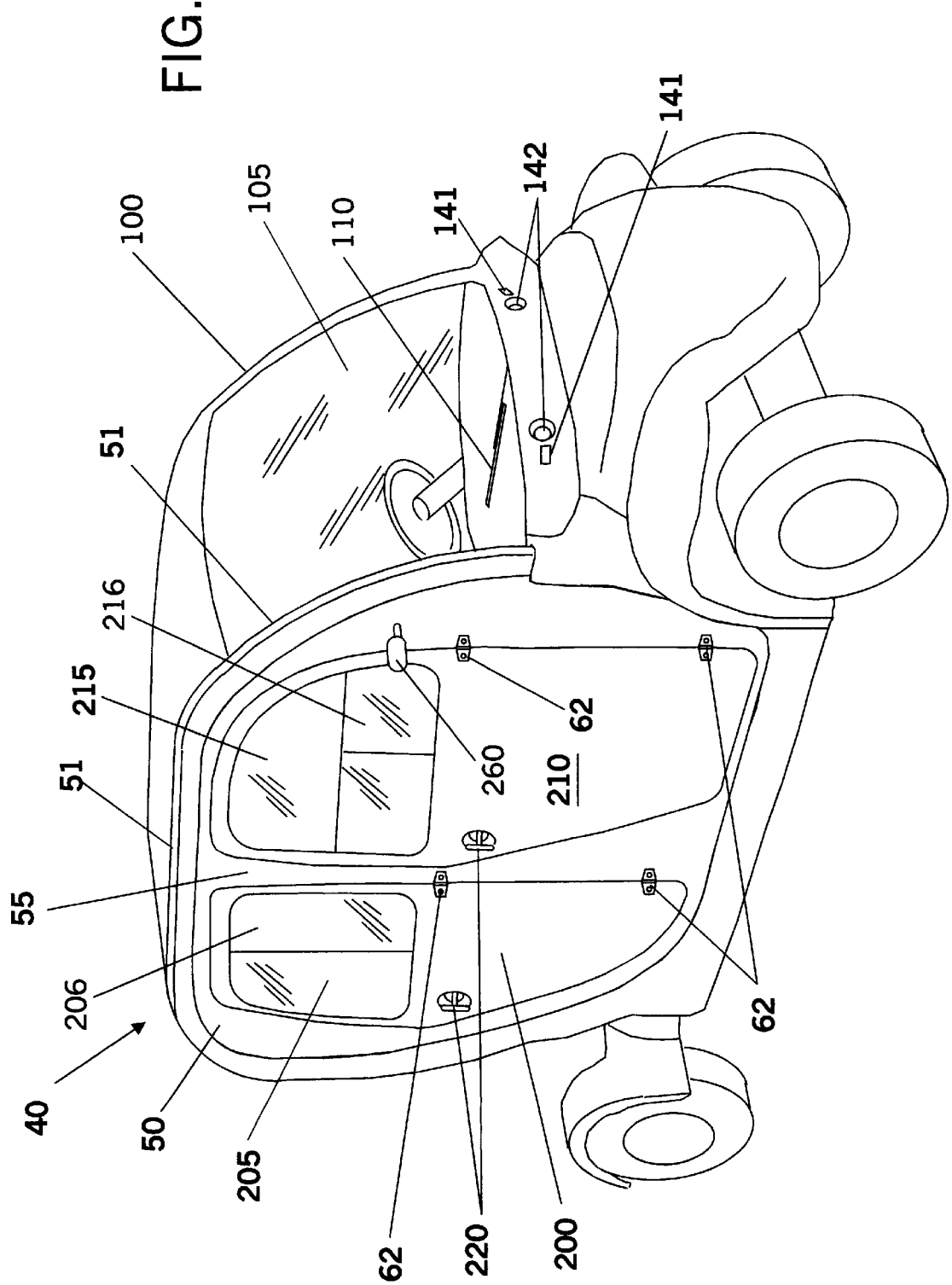
FIG. 5 shows the current invention in place on the passenger side of one type of street-ready low-speed vehicle.

FIGS. 3 to 5 show the current invention designed for a four-passenger, two-seat, street-legal electric vehicle of the type manufactured by Global Electric Motorcars. It will be readily appreciated by one of skill in the art that the principles employed for this particular model of this invention are easily varied to create a similar door system for a two-passenger, street-legal vehicle manufactured by the Global Electric Motorcar Company, the Ford Think Neighbor vehicle, or to fit on an E-Z Go or CLUB CAR golf cart or other electric vehicles manufactured by other manufacturers.

FIG. 3 shows the framework (50) of the current invention as it is designed to fit on the four-passenger, street-legal vehicle manufactured by the Global Electric Motorcars. This particular framework is for the passenger side. It will be readily appreciated by one of skill in the art that the central pillar (55) of the framework (50) creates a front door opening (56) and a rear door opening (57). The framework (50) is shown without doors attached. This framework is ordinarily constructed using a mold (not shown). Such materials as fiberglass or various types of plastic can be formed in the mold to result in the framework (50). Different types of vehicles to which the framework is to be applied to create a door system will require a different mold. However, it will be readily appreciated by one of ordinary skill in the art that the design of the framework (50) hence, the mold from which the framework is formed, is largely dictated depending on the type or model of the vehicle to which the framework is to be applied.

FIG. 4 shows the door system (40) beside the passenger side of a Global Electric motorcar vehicle (100). The windshield (105) and wiper (110) and a side mirror (260) are seen in this view, as well as the front turn signals (141) and headlights (142) for the vehicle (100). The framework (50) attaches to the vehicle (100) and replaces a portion of the side molding of the vehicle (100). Thus, the door system (40) either replaces or fits over the portion of the crosshatched part of the vehicle (100). Weather-tight construction is assisted by a molding (51) (seen in FIG. 5) which prevents air or water leaks at the point of attachment of the framework (50) to the vehicle (100). It also reduces the chance of squeaks and rattles. The central pillar (55) of the framework (50) provides the point of attachment for the hinges (62) for the rear door (200). The front door (210) also attaches by hinges (62). Locking handles (220) provide easy opening and closing for both the front door (210) and the rear door (200). There is a rear door window (205) and a front door window (215). The rear window (205) is constructed of two pieces with the front piece (206) slide mounted so at least a portion of the rear window (205) can be opened. The front window (215) is constructed of three pieces. The lower front piece (216) is slide mounted so a portion of the front window (215) may be opened or closed as is necessary. The hinges (62) are designed so that either the front door (210) or the rear door (200) may be easily lifted from the hinges and entirely removed from the vehicle (100). The framework (50) attaches to the vehicle (100) and becomes an integral part of the vehicle as much as any other fixed part of the vehicle (100). The framework (50) replaces a portion of the crosshatched section of the body construction on the vehicle (100). That is to say, when the current invention is attached to the vehicle, the a portion crosshatched part is first removed from the vehicle (100) and the current invention is attached to the vehicle (100) to replace the removed portion. By this relatively permanent attachment of the framework (50) to the vehicle (100), it provides that the door system (40) will be as durable as the vehicle (100) itself. The door system (40) is not designed to be safe or provide extra protection in a collision. However, it will have safety advantages in that it provides a relatively secure enclosure against someone inadvertently losing their balance or losing consciousness, thus falling out of the open side of the vehicle (100) that is not equipped with the door system (40). Once the framework (50) is attached to the vehicle (100), the doors may be easily mounted and dismounted using the hinges (62). In warm, sunny weather, the doors (200) and (210) will be removed from the vehicle. When rainy or cold weather appears, the doors can be remounted providing a weather-tight enclosure.

FIG. 5 shows the door system (40) bolted to the vehicle (100), replacing a portion of the crosshatched molded piece and fitting over the remainder of the crosshatched molded piece as seen FIG. 4. A weather-tight molding (51) is used between the framework (50) and the vehicle (100). The molding (51) reduces the risk of air or water leaks and also prevents squeaks and rattles. As can be seen in FIG. 5, the door system (40) is now an integral part of the vehicle (100). The rear door (200) and the front door (210) open using the handles (220) and the hinges (62) in the standard way. Both the front window (215) and the rear window (205) may be opened using the sliding portions (206) and (216). A side mirror (260) is mounted on the framework (50) as opposed to mounted on the crosshatched portion of the vehicle (100) seen in FIG. 4. The vehicle (100) so equipped is now an enclosed four door vehicle with easily mountable and attachable doors (200) and (210). This makes the vehicle much more convenient to use in rainy or cold weather. However, in warm or otherwise clement weather, the doors (200) and (210) may be easily removed from their hinges (62) providing the pleasant open air feeling of a vehicle (100) with open sides.

It will be appreciated by one of skill in art that variations in the design and construction of th door system and how it is attached to a vehicle may be varied without departing from the spirit of this invention. The above description is by way of example and not of limitation. The only limitations are in the claims which follow.

I claim:

1. An accessory door system of a particular model open-sided low-speed vehicle having a first structure surrounding and defining a first open side and a second structure surrounding and defining a second open side comprising:

(a) a first rigid framework and a second rigid framework of a given size and shape, said given size and shape matching said first structure surrounding and defining a first open side and said second structure surrounding and defining a second open side of said particular model of a low-speed vehicle;

(b) a first means for attaching said first rigid framework to said particular model low-speed vehicle whereby said first rigid framework fits over said first open side and replaces at least a portion of said first structure of said particular model low-speed vehicle said replaced first portion defining said first open side and said first rigid framework becomes a permanent part of said particular model low-speed vehicle;

(c) a second means for attaching said second rigid framework to said particular model low-speed vehicle whereby said second rigid framework fits over said second open side and replaces at least a portion of said second structure of said particular model low-speed vehicle said replaced second portion defining said second open side and said second rigid framework becomes a permanent part of said particular model low-speed vehicle;

(d) at least one first door designed to fit within said first rigid framework and enclose an opening in said first rigid framework;

(e) at least one second door designed to fit within and enclose an opening in said second rigid framework;

(f) a first means for attaching said first door to said first rigid framework;

(g) a second means for attaching said second door to said second rigid framework whereby said first framework and said second framework and said at least one second door and said at least one first door form a weather-tight, permanently mounted, openable door system for said particular model low-speed vehicle.

2. The accessory door system for a particular open-sided low-speed vehicle of claim 1 wherein a first molding is placed between said first rigid framework and said first structure of said particular model low speed vehicle and a second molding is placed between said second rigid framework and said second structure of said particular model low speed vehicle.

3. The accessory door system for a particular open-sided low-speed vehicle of claim 2 wherein said first framework and said second framework are made of a material similar to said at least a portion of said first structure and said second structure replaced by said first framework and said second framework.

4. The accessory door system for a particular open-sided low-speed vehicle of claim 3 wherein said first door and said second door are equipped with openable weather-tight windows.

5. The accessory door system for a particular open-sided low-speed vehicle of claim 4 wherein said first means for attaching said first door and said second means for attaching said second door allow said first door to be removed from said first rigid framework and said second door to be removed from said second rigid framework.

6. A method for enclosing open sides of a particular low speed vehicle having a first structure surrounding and defining a first open side and a second structure surrounding and defining a second open side with an accessory door system comprising the steps of:

(a) forming rigid frameworks of material similar to the structure material of said particular low speed vehicle;

(b) attaching the rigid frameworks to the open sides of a particular low speed vehicle replacing at least a portion of said first structure and said second structure of a particular low speed vehicle said replaced portions defining said first open side and said second open side;

(c) forming doors of a material to fit within said rigid framework;

(d) attaching doors to the rigid frameworks, said doors pivoting open and closed as required;

whereby a weathertight openable door system is provided to enclose said particular lowspeed vehicle.

7. The method for enclosing open sides of a particular low speed vehicle having a first structure surrounding and defining a first open side and a second structure surrounding and defining a second open side with an accessory door system as recited in claim 6, wherein said steps of attaching rigid frameworks further comprises adding a molding between said rigid frameworks and said particular low speed vehicle whereby said molding adds to the overall weathertightness and noise reduction provided by said accessory door system to said particular low speed vehicle.

8. The method for enclosing open sides of a particular low speed vehicle having a first structure surrounding and defining a first open side and a second structure surrounding and defining a second open side with an accessory door system as recited in claim 7, wherein said steps of forming doors further comprises removably attaching said doors to said rigid frameworks whereby said doors may be mounted or unmounted at the discretion of a user of said accessory door system.

* * * * *